United States Patent
Jetcheva

(10) Patent No.: US 10,172,086 B2
(45) Date of Patent: Jan. 1, 2019

(54) SENSOR READING DEVICE AND SYSTEM

(71) Applicant: FUJITSU LIMITED, Kawasaki-shi, Kanagawa (JP)

(72) Inventor: Jorjeta G. Jetcheva, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/436,618

(22) Filed: Feb. 17, 2017

(65) Prior Publication Data

US 2018/0242253 A1    Aug. 23, 2018

(51) Int. Cl.
*H04W 52/02* (2009.01)
*H04B 11/00* (2006.01)
*H04W 4/80* (2018.01)

(52) U.S. Cl.
CPC ........ *H04W 52/0235* (2013.01); *H04B 11/00* (2013.01); *H04W 4/80* (2018.02)

(58) Field of Classification Search
None
See application file for complete search history.

(56) References Cited

U.S. PATENT DOCUMENTS

| 2003/0227893 | A1* | 12/2003 | Bajic | H04L 49/70 370/338 |
| 2014/0254470 | A1* | 9/2014 | Wendling | H04L 69/08 370/315 |
| 2016/0165599 | A1* | 6/2016 | Xu | H04W 24/04 370/315 |

OTHER PUBLICATIONS

Jorjeta G. Jetcheva and David B. Johnson. "Adaptive Demand-Driven Multicast Routing in Multi-Hop Wireless Ad Hoc Networks." Proceedings of the ACM Symposium on Mobile Ad Hoc Networking and Computing (MobiHoc 2001), Long Beach, CA, Oct. 2001.

Josh Broch, David A. Maltz, David B. Johnson, Yih-Chun Hu, and Jorjeta Jetcheva. "A Performance Comparison of Multi-Hop Wireless Ad Hoc Network Routing Protocols." Proceedings of the Fourth Annual International Conference on Mobile Computing and Networking (MobiCom 1998), pp. 85-97, ACM, Dallas, TX, Oct. 1998.

* cited by examiner

*Primary Examiner* — Mohammed Rachedine
(74) *Attorney, Agent, or Firm* — Maschoff Brennan

(57) ABSTRACT

A device may include a wireless communication interface configured to communicate with a sensor reading device, receive a wake up command from the sensor reading device, and receive reflected energy from a sensor. The device may also include one or more processors, and one or more non-transitory computer readable media including instructions that, when executed by the one or more processors, perform or control performance of operations. The operations may include performing a wake up operation based on the wake up command from the sensor reading device, and recording the reflected energy from the sensor. The operations may further include generating a report regarding the reflected energy, and causing the wireless communication interface to transmit the report to the sensor reading device.

20 Claims, 5 Drawing Sheets

SENSOR READING DEVICE AND SYSTEM

FIELD

The embodiments discussed in the present disclosure are related to sensor reading devices and systems.

BACKGROUND

A few options exist for tracking and labeling of physical objects. For example, manual identification, counting, and tracking is one possible option. Another option may use barcodes or other graphical identifiers to facilitate tracking and labeling of physical objects. Another approach may include the use of radio frequency identification (RFID) tags to track and label physical objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a device that includes a wireless communication interface configured to communicate with a sensor reading device, receive a wake up command from the sensor reading device, and receive reflected energy from a sensor. The device may also include one or more processors, and one or more non-transitory computer readable media including instructions that, when executed by the one or more processors, perform or control performance of operations. The operations may include performing a wake up operation based on the wake up command from the sensor reading device, and recording the reflected energy from the sensor. The operations may further include generating a report regarding the reflected energy, and causing the wireless communication interface to transmit the report to the sensor reading device.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments of the present disclosure relate to sensor reading devices and systems. In some embodiments, a sensor reading system may utilize an intermediate device to facilitate the sensor reading device obtaining information from a sensor. The sensor reading device may send a command to the intermediate device to wake up and transition to a normal mode of operation instead of a lower-power mode. The sensor reading device may also transmit a query signal to the sensors. The sensors may reflect back some of the energy of the query signal to the sensor reading device, and the reflected energy may be received by the intermediate device. In some embodiments, the sensors may include passive RFID tags that reflect back an identifier of a given sensor. The intermediate device may generate a report of the received reflected energy, and may provide the report to the sensor reading device.

Embodiments of the present disclosure are explained with reference to the accompanying drawings.

Figure 1:
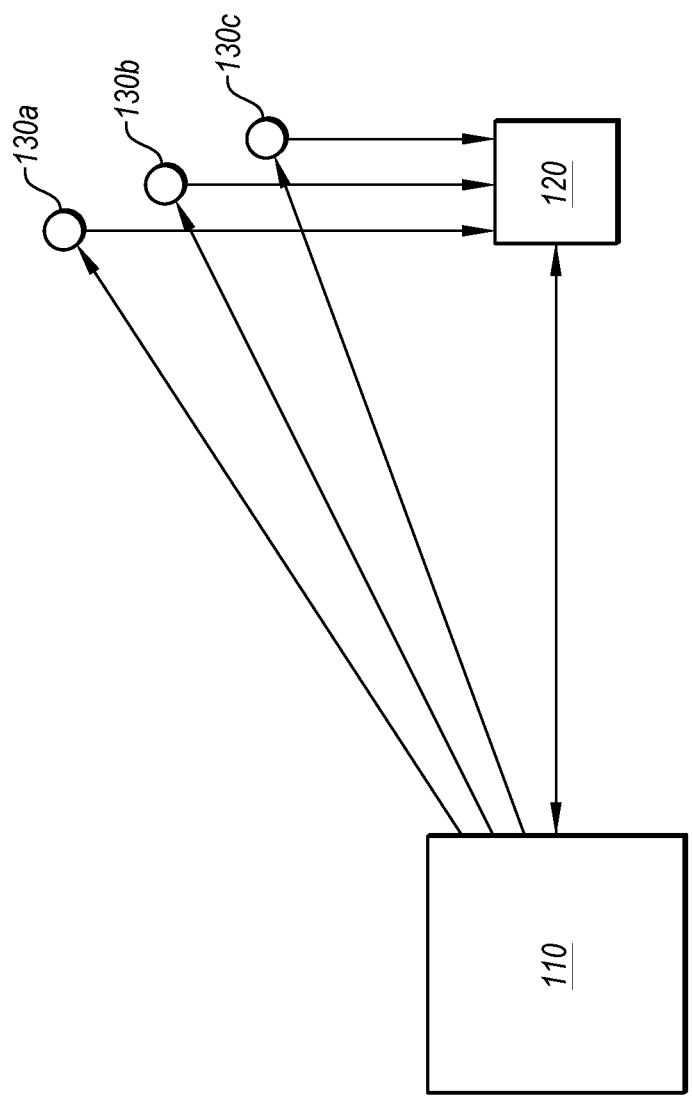
FIG. 1 illustrates an example system related to sensor reading.

FIG. 1 illustrates an example system 100 related to sensor reading, in accordance with one or more embodiments of the present disclosure. The system 100 may include a sensor reading device 110, an intermediate device 120, and one or more sensors 130, such as the sensors 130a, 130b, and 130c.

The sensor reading device 110 may include any system or device configured to obtain information regarding the one or more sensors 130. For example, the sensor reading device may include a computing system, such as a computing system illustrated in FIG. 5. In some embodiments, the sensor reading device 110 may include a communication interface configured to transmit wireless signals to communicate with the intermediate device 120 and the sensors 130. For example, the sensor reading device 110 may be configured to transmit a command to adjust or modify the mode of operation of the intermediate device, such as from a sleep mode to an awake mode, or receive a report from the intermediate device 120. As another example, the sensor reading device 110 may be configured to transmit a query signal to the sensors 130 to obtain information from the sensors 130.

In some embodiments, the sensor reading device 110 may perform one or more operations based on the information received from the sensors 130. For example, the sensor reading device 110 may determine the physical location of one or more of the sensors 130 based on information from the sensors 130. As another example, the sensor reading device 110 may track the locations of the sensors 130 at different points in time.

In some embodiments, the system 100 may include one or more items, goods, or other physical chattel that is to be tracked or identified. One or more of the sensors 130 may be attached to the items, goods, or other chattel. For example, each item, good, or chattel may have one sensor placed upon it to track, identify, or locate that item, good, or chattel.

In some embodiments, the non-powered embodiments of the sensors 130 may communicate with other components in the system 100 using back scatter of RF signals. For example, the sensors 130 may be configured to reflect or transmit back some portion of energy received at the sensors 130. In some embodiments, the energy received at the sensors 130 may be configured to excite or activate certain components of the sensors 130, causing the sensors 130 to emit or transmit back a signal that includes an identifier of the sensor. For example, the sensors 130 may include a passive RFID tag. In these and other embodiments, the sensors 130 may receive a radio wave of a first energy, and then release a signal identifying the RFID tag at a second energy lower than the first energy. In some embodiment, a query signal from the sensor reading device 110 to the sensors 130 may include a radio signal to cause the sensors 130 to emit or transmit back a signal identifying the sensors 130. In these and other embodiments, the reception of energy and resulting transmission of energy based on the prior reception by the same sensor or device may be referred to as reflected energy or back scattered energy. As another example, the sensors 130 may include a sensor to harvest energy such as ambient electromagnetic energy, and storing that energy in a capacitor. Receiving the query signal may cause such an energy harvesting sensor to release the stored energy as a wireless signal with an identifier. Additionally or alternatively, such an energy harvesting sensor may harvest energy from the query signal and use that energy to transmit the wireless signal with the identifier. In these and other embodiments, the sensors 130 may be non-powered components without a dedicated power source or supply (e.g., batteries, connections to power outlets or other power sources). Rather, the sensors 130 may be configured to receive, absorb, harvest, or otherwise internalize energy from the query signal and use that energy to emit one or more signals.

For example, the sensor reading device 110 may be configured to transmit a first RF (radio frequency) signal of a first energy. A sensor 130 may have an antenna tuned to receive the RF signal. The RF signal may cause a current to be generated in the antenna. The current may activate an integrated circuit. The integrated circuit may adjust a capacitance and/or resistance of the antenna based on an identification of the sensor 130 stored on the sensor 130 to modulate the current in the antenna with the identification. The modulated current in the antenna may cause the generation of a second RF signal that is transmitted. The second RF signal may be a modulation of the first RF signal, including an amplitude, phase, or frequency modulation of the first RF signal. Additionally or alternatively, the second RF signal may include the identification of the sensor 130. The second RF signal being generated based on the first RF signal may have a second energy lower than the first energy.

In some embodiments, because the second energy is lower than the first energy, the signal emitted from the sensors 130 may be difficult to detect. In these and other embodiments, the intermediate device 120 may be disposed proximate the sensors 130 and may have a power-management scheme to provide an efficient and low-cost option to facilitate the reading of information from the sensors 130 without requiring a constantly-powered device or expensive circuitry for high-sensitivity signal detectors. In these and other embodiments, the intermediate device 120 may include low cost circuitry to detect the signals, such as the back scatter, emitted from the sensors 130. Additionally or alternatively, the intermediate device 120 may not include high powered circuitry to generate a signal strong enough to cause the sensors 130 to generate the reflected signal, further allowing for low cost circuitry in the intermediate device 120.

Figure 3:
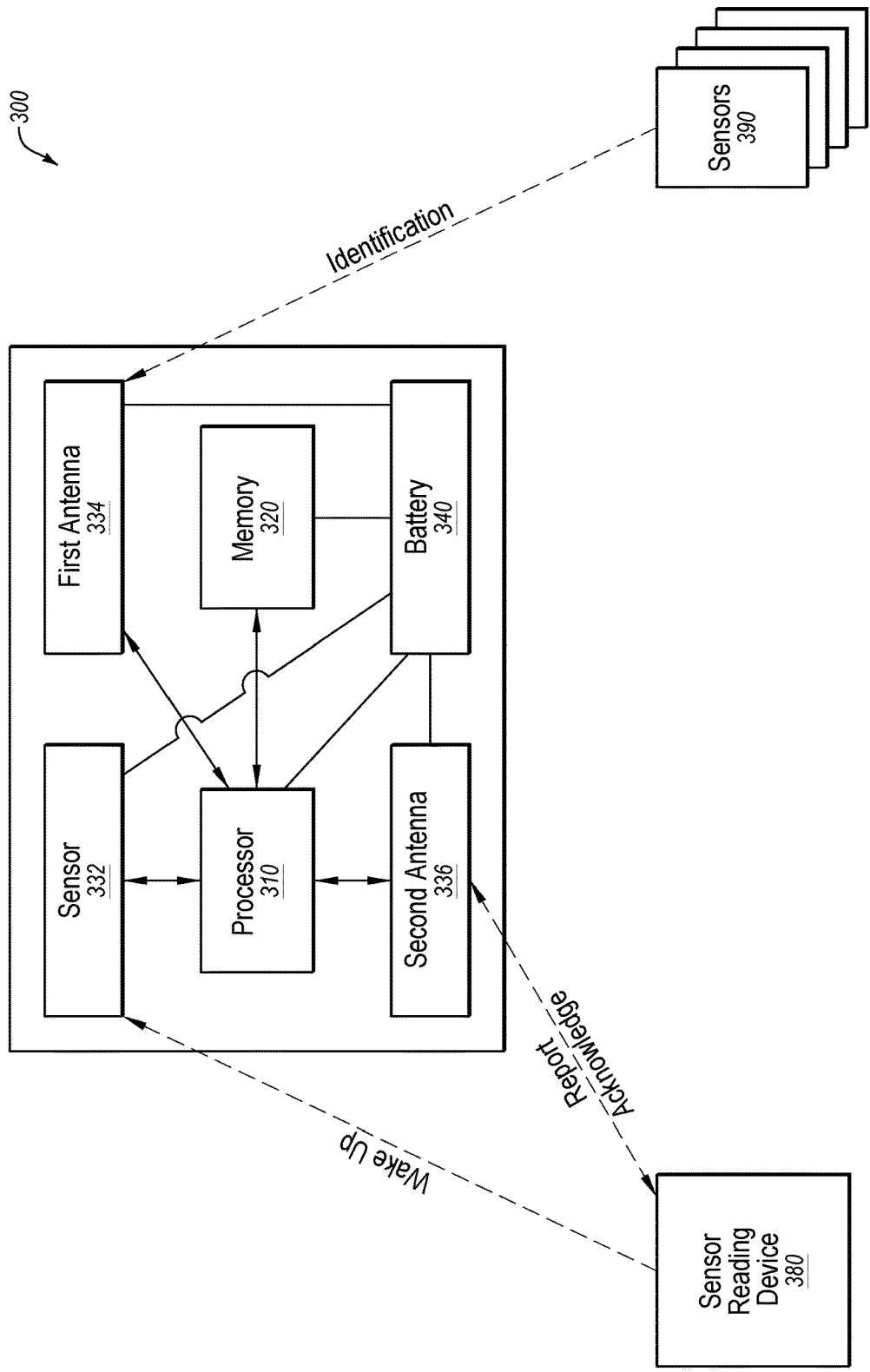
FIG. 3 illustrates an example of an intermediate device.
Figure 5:
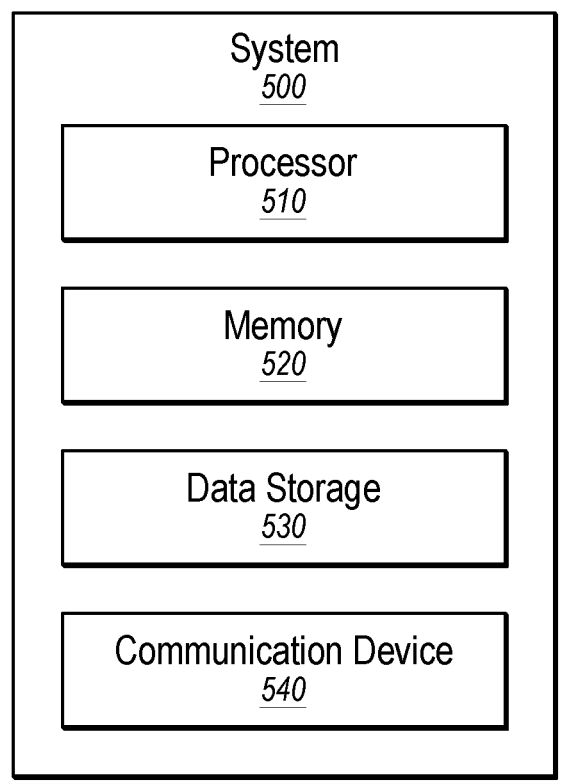
FIG. 5 illustrates an example computing system.

In some embodiments, the intermediate device 120 may include any device or system configured to facilitate the sensor reading device 110 obtaining information from the sensors 130. For example, the intermediate device 120 may be configured to detect back scatter from one or more of the sensors and provide the detected information to the sensor reading device 110 in a report. In some embodiments, the intermediate device 120 may be configured to decode the back scatter such that the reflected signal may be converted to another form of information, such as bits representing a number, or the like. In these and other embodiments, the intermediate device 120 may be configured to receive information from the sensors 130 at a first point in time without transmitting information to the sensor reading device 110 at the first point in time. At a second point in time, the intermediate device 120 may be configured to transmit the report to the sensor reading device 110 without detecting information from the sensors 130. In some embodiments, the intermediate device 120 may be implemented as illustrated in FIG. 3, or as a computing system such as illustrated in FIG. 5.

In some embodiments, the intermediate device 120 may be placed in proximity to the one or more sensors 130 to facilitate the intermediate device 120 being able to detect the potentially low energy signals emitted from the sensors 130. For example, the intermediate device 120 may be placed in a closet, cabinet, shelf, or different room from the sensor reading device 110 but proximate the sensors 130 such that the intermediate device 120 may detect the signals from the sensors 130 and may communicate those signals to the sensor reading device 110. In some embodiments, the sensor reading device 110 may transmit a query signal through a physical barrier such as a door or a wall and the sensors 130 may reflect the energy but at a level insufficient to traverse the physical barrier. The intermediate device 120 may receive the reflected energy and may transmit a report to the sensor reading device 110 through the physical barrier. For example, the sensor reading device 110 may transmit an RF query signal that passes through a door to one or more sensors 130 in a closet. The sensors 130 may reflect back a weak RF signal that is received by the intermediate device 120 but unable to pass through the door. The intermediate device 120 may generate and transmit a report to the sensor reading device 110 using a higher strength RF signal, such as a Wi-Fi or Bluetooth signal, that is able to pass through the door to the sensor reading device 110.

In some embodiments, the intermediate device 120 may be configured with a power-managed operation. The intermediate device 120 may be configured to be in a low-power, sleep mode by default. The intermediate device 120 may be configured to perform one or more operations in the sleep mode, such as monitoring for a wake up command from the sensor reading device 110. In some embodiments, the sensor reading device 110 may transmit a wake up command to the intermediate device 120. The wake up signal may cause the intermediate device 120 to operate in a normal mode of operation. For example, the intermediate device may include a sensor that monitors for a wake up signal and in response to detecting the wake up signal, sends a signal to a pin of a processor to cause the processor to read and execute information from a particular block of memory, causing the intermediate device 120 to transition to a normal state of operation. In some embodiments, the intermediate device 120 may operate in the normal mode of operation for a limited amount of time, such as a predetermined period of time, for a duration of time identified by the wake up signal, or until one or more tasks have been completed. Additionally or alternatively, the wake up signal may cause the intermediate device 120 to remain in a normal mode of operation until a sleep command is received from the sensor reading device 110. Such a wakeup signal may include a wireless signal, such as an ultrasonic signal.

In some embodiments, the wake up command may be received via a specific motion that is detected by the intermediate device 120. For example, the intermediate device may be located proximate a robot and may detect the robot performing a specific motion signature or gesture that causes the intermediate device 120 to wake up. For example, the sensor reading device 110 may command the robot to perform the specific motion signature or gesture to cause the intermediate device 120 to wake up.

In some embodiments, the intermediate device 120 may be powered by a battery. For example, the intermediate device 120 may include one or more batteries that operate as the only source of power for the intermediate device 120. In some embodiments, the intermediate device 120 may be configured with the power-managed operation such that the intermediate device 120 may operate for an extended duration of time before the battery being changed, such as for six months, one year, eighteen months, two years, three years, four years, or five years, or even longer.

In some embodiments, the sensor reading device 110 may be configured to communicate with the intermediate device 120 and the sensors 130 to obtain information from the sensors 130. For example, the sensor reading device 110 may transmit a wake up signal to the intermediate device 120 such that the intermediate device 120 is prepared to detect signals emitted from the sensors 130. After the intermediate device 120 is awake, the sensor reading device 110 may transmit a query signal to the sensors 130, and the sensors 130 may reflect back at least some of the energy of the query signal. The intermediate device 120 may detect the energy reflected back from the sensors 130, and may compile information associated with the reflected energy into a report. After compiling the report, the intermediate device 120 may transmit the report to the sensor reading device 110.

In some embodiments, the intermediate device 120 may transmit the report directly to the sensor reading device 110 using one or more device to device communication protocols. Additionally or alternatively, the intermediate device 120 may transmit the report to the sensor reading device 110 via one or more intervening devices, such as a network router or another intermediate device.

In some embodiments, the report may include an identifier and signal strength associated with each sensor 130 from which the intermediate device 120 detected reflected energy. Additionally or alternatively, the report may include multiple signal strength readings for each sensor 130 from which the intermediate device 120 detected any reflected energy. For example, the sensor reading device 110 may be configured to transmit a series of query signals such that multiple signal strength readings may be obtained. In some embodiments, the intermediate device 120 may be configured to average the multiple signal strength readings and the report may include a single signal strength reading. In some embodiments, the report may include an identifier of the intermediate device 120, such that if more than one intermediate device were used, the sensor reading device 110 may determine which of the intermediate devices submitted the report.

In some embodiments, after receiving the report, the sensor reading device 110 may transmit an acknowledgment response to the intermediate device 120 that may cause the intermediate device to return to sleep mode. In some embodiments, the intermediate device 120 may attempt to resend the report a predetermined number of times if the intermediate device 120 fails to receive an acknowledgement response for a certain period of time. For example, the intermediate device 120 may transmit the report to the sensor reading device 110, and if no acknowledgment response is received within four seconds, the report may be transmitted again, and the cycle may be repeated a number of times, such as five. Such retransmission may be repeated any number of times, and any duration of time may be waited before re-transmitting the report.

Modifications, additions, or omissions may be made to the system 100 without departing from the scope of the present disclosure. For example, the system 100 may include any number of sensor reading devices 110, intermediate devices 120, and sensors 130.

Figure 2:
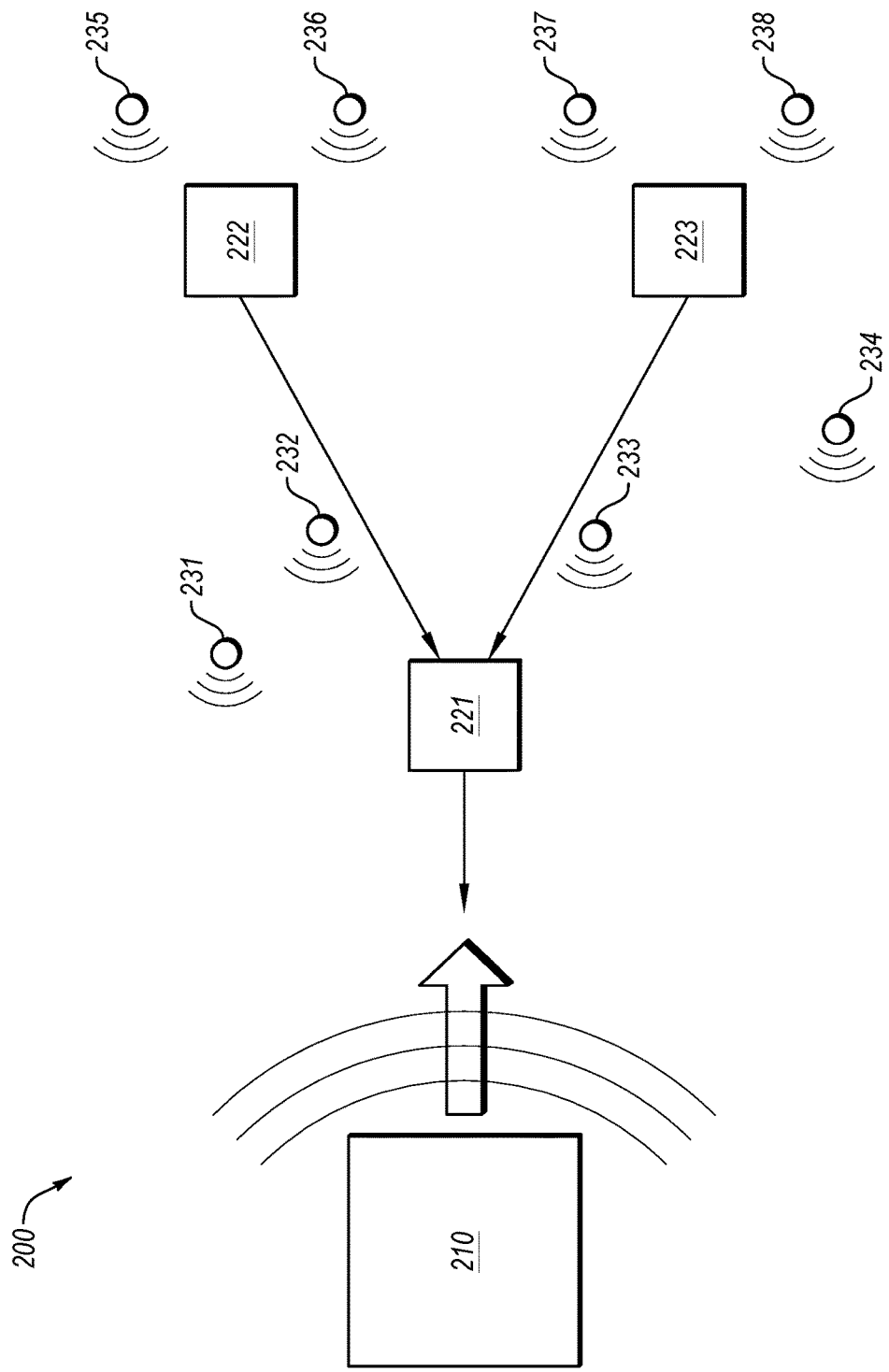
FIG. 2 illustrates another example system related to sensor reading.

FIG. 2 illustrates an example system 200 related to sensor reading, in accordance with one or more embodiments of the present disclosure. The system 200 illustrates an embodiment that includes more than one intermediate device. The operation of the system 200 may be similar or comparable to the operation of the system 100, but expanded as explained below. The system 200 may include a sensor reading device 210 (that may be similar or comparable to the sensor reading device 110 of FIG. 1); first, second, and third intermediate devices 221, 222, and 223 (that may be similar or comparable to the intermediate device 120 of FIG. 1); and sensors 231-238 (that may be similar or comparable to the sensors 130 of FIG. 1).

In some embodiments, the sensor reading device 210 may transmit a single wake up command that is received by multiple intermediate devices, such as the first, second, and third intermediate devices 221, 222, and 223. For example, the sensor reading device 210 may broadcast an ultrasonic signal and the first, second, and third intermediate devices 221, 222, and 223 may be in a sleep mode monitoring for such an ultrasonic signal to wake up. For example, while the remainder of the components are not powered, a sensor of the first, second, and/or third intermediate device 221, 222, and 223 may monitor for a signal that is the wake up command. Based on the wake up command, the first, second, and third intermediate devices 221, 222, and 223 may change to a normal mode of operation.

In some embodiments, the sensor reading device 210 may transmit a sleep command to one or more of the intermediate devices. For example, if the sensor reading device 210 was interested in obtaining information from the sensors 235 and 236 proximate the second intermediate device 222, the sensor reading device 210 may transmit a sleep command to the third intermediate device 223.

In some embodiments, the sensor reading device 210 may transmit a single query signal that may be received by multiple sensors. For example, the query signal may be received by all of the sensors 231-238. In some embodiments, if the sensor reading device 210 intends to query certain sensors and is aware of an expected location of the sensors, the sensor reading device 210 may transmit a localized or directed query signal to the expected location of the sensors by adjusting the orientation of the transmitting antenna or otherwise adjusting a signal property of the transmitted signal, such as polarity, amplitude, among others. For example, the sensor reading device 210 may transmit a directed query signal towards the sensors 235 and 236 which may or may not be received by the sensors 234 and 238.

The first, second, and third intermediate devices 221, 222, and 223 may be configured to receive reflected energy from one or more of the sensors 231-238. In some embodiments, the intermediate devices may be configured to use the received energy to obtain information to generate a report. In these and other embodiments, the report may include an identifier included in the received energy identifying the sensor and/or the signal strength of the received reflected energy as measured by the respective intermediate device. For example, the second intermediate device 222 may receive a first signal from the sensor 235, a second signal from the sensor 236, and a third signal from the sensor 237. The first and second signals may be larger than the third signal because of the proximity of the sensors 235 and 236 to the second intermediate device as compared to the sensor 237.

In some embodiments, a multi-hop mesh may be created between the intermediate devices to provide the reports of the intermediate devices to the sensor reading device 210. Using such a multi-hop mesh, the transmitting power of the intermediate devices may be lower than if the intermediate devices all had to reach the sensor reading device 210. For example, the second and third intermediate devices 222 and 223 may have a transmitting power strong enough to reach the first intermediate device 221 rather than strong enough to reach the sensor reading device 210. In these and other embodiments, the second intermediate device 222 and the third intermediate device 223 may each be configured to send a report to the first intermediate device 221. Such a report may include an identifier that identifies the intermediate device transmitting the report. In these and other embodiments, the first intermediate device 221 may forward any received reports to the sensor reading device 210. Additionally or alternatively, the first intermediate device 221 may wait to transmit the report of the first intermediate device 221 until the first intermediate device 221 has received reports from the second intermediate device 222 and/or the third intermediate device 223.

In some embodiments, one or more intermediate devices in the multi-hop mesh, such as the first intermediate device 221, may be configured to combine or compile multiple reports into a single report. For example, the first intermediate device 221 may append or otherwise join other received reports to the report initially generated by the first intermediate device 221.

In some embodiments, the sensor reading device 210 may be configured to determine the location of one or more of the sensors based on the received report or reports. For example, the sensor reading device 210 may utilize signal strengths associated with a received signal from a sensor received at multiple intermediate devices to determine a location. Additionally or alternatively, the sensor reading device 210 may utilize signal strength to determine a proximity to a given intermediate device or a given sensor. For example, if the intermediate devices are at known, fixed locations, by having readings from multiple intermediate devices of the signal strength of the received signal for a given sensor, the location of that sensor may be determined relative to the multiple intermediate devices based on the relative signal strengths. As a further example, if a given sensor is at a known, fixed location, that given sensor may serve as a reference point against which other sensors may be compared.

Modifications, additions, or omissions may be made to the system 200 without departing from the scope of the present disclosure. For example, the system 200 may include any number of sensor reading devices 210, intermediate devices, and sensors. As another example, any size or arrangement of multi-hop mesh may be generated using the intermediate devices.

FIG. 3 illustrates an example intermediate device 300, in accordance with one or more embodiments of the present disclosure. The intermediate device 300 may be similar or comparable to the intermediate device 120 of FIG. 1, or the first, second, or third intermediate devices 221, 222, and 223 of FIG. 2. FIG. 3 additionally illustrates a sensor reading device 380 (that may be similar or comparable to the sensor reading device 110 of FIG. 1 and/or the sensor reading device 210 of FIG. 2) and sensors 390 (that may be similar or comparable to the sensors 130a-130c of FIG. 1, or the sensors 231-238 of FIG. 2).

In some embodiments, the intermediate device 300 may include a processor 310 for controlling operations of the intermediate device 300 and a memory 320 for storing instructions to perform operations and/or storing data received and/or processed by the intermediate device. The processor 310 may be similar or comparable to the processor 510 of FIG. 5 and the memory 320 may be similar or comparable to the memory 520 and/or the data storage 530 of FIG. 5.

In some embodiments, the intermediate device 300 may include a sensor 332 for receiving a wake up signal from the sensor reading device 380, a first antenna 334 for receiving signals from the sensors 390, and a second antenna 336 for communicating with the sensor reading device 380. Collectively, the sensor 332, the first antenna 334, and the second antenna 336 may be referred to as a communication interface. Each component of the communication interface may communicate via a different communication protocol. For example, the sensor 332 may communicate via ultrasonic signals, the first antenna 334 may communicate via RF signals, and the second antenna 336 may communicate via a Wi-Fi signal. In these and other embodiments, the intermediate device 300 may include a battery 340 for providing power to one or more of the components of the intermediate device 300.

In some embodiments, the sensor 332 may include a diaphragm, microphone, or other sensor configured to receive an ultrasonic signal. Additionally or alternatively, the sensor 332 may include an antenna or other device for receiving another type of signal. The sensor 332 may be configured to receive the wake up signal and cause a pin of the processor 310 to receive an electrical signal that may cause the processor 310 to retrieve and execute instructions from the memory 320. Additionally or alternatively, the wake up signal may cause the processor 310 to perform a wake up operation that may signal the battery 340 to begin providing power to one or more of the components of the intermediate device 300. Additionally or alternatively, the sensor 332 may be coupled to the battery such that the wake up signal may cause the battery to being providing power to one or more components of the intermediate device 300.

In some embodiments, the first antenna 334 may be tuned, shaped, or otherwise configured to receive signals from the sensors 390. The signals may include RF signals modulated to include an identifier associated with a given sensor of the sensors 390. In some embodiments, the first antenna 334 may receive power from the battery 340 to facilitate the first antenna 334 detecting signals from the sensors 390.

The processor 310 may be configured to monitor the signal strength of the signals received from the sensors 390 and store the signal strength and/or identification associated with the signals in the memory 320. Additionally or alternatively, the processor 310 may be configured to generate a report of the stored signal strength and/or identifications. The report may additionally or alternatively include an identifier associated with the intermediate device 300.

In some embodiments, the second antenna 336 may be configured to communicate with the sensor reading device 380. For example, the second antenna 336 may be configured to transmit the report based on instructions from the processor 310. Additionally or alternatively, the second antenna 336 may receive an acknowledgment signal from the sensor reading device 380 acknowledging receipt of the report. The sensor reading device 380 may additionally communicate other commands to the intermediate device 300, such as a sleep command, a stay awake command, among others. The second antenna 336 may communicate with the sensor reading device 380 via any wireless communication protocol, such as Bluetooth communication, Wi-Fi communication, or any other communication protocol. In some embodiments, the second antenna 336 and the sensor 332 may be combined as a single component.

Modifications, additions, or omissions may be made to the intermediate device 300 without departing from the scope of the present disclosure. For example, the intermediate device 300 may include any number of antennas and/or communication components as part of a communication interface. As another example, any number of batteries may be included in the intermediate device 300.

Figure 4:
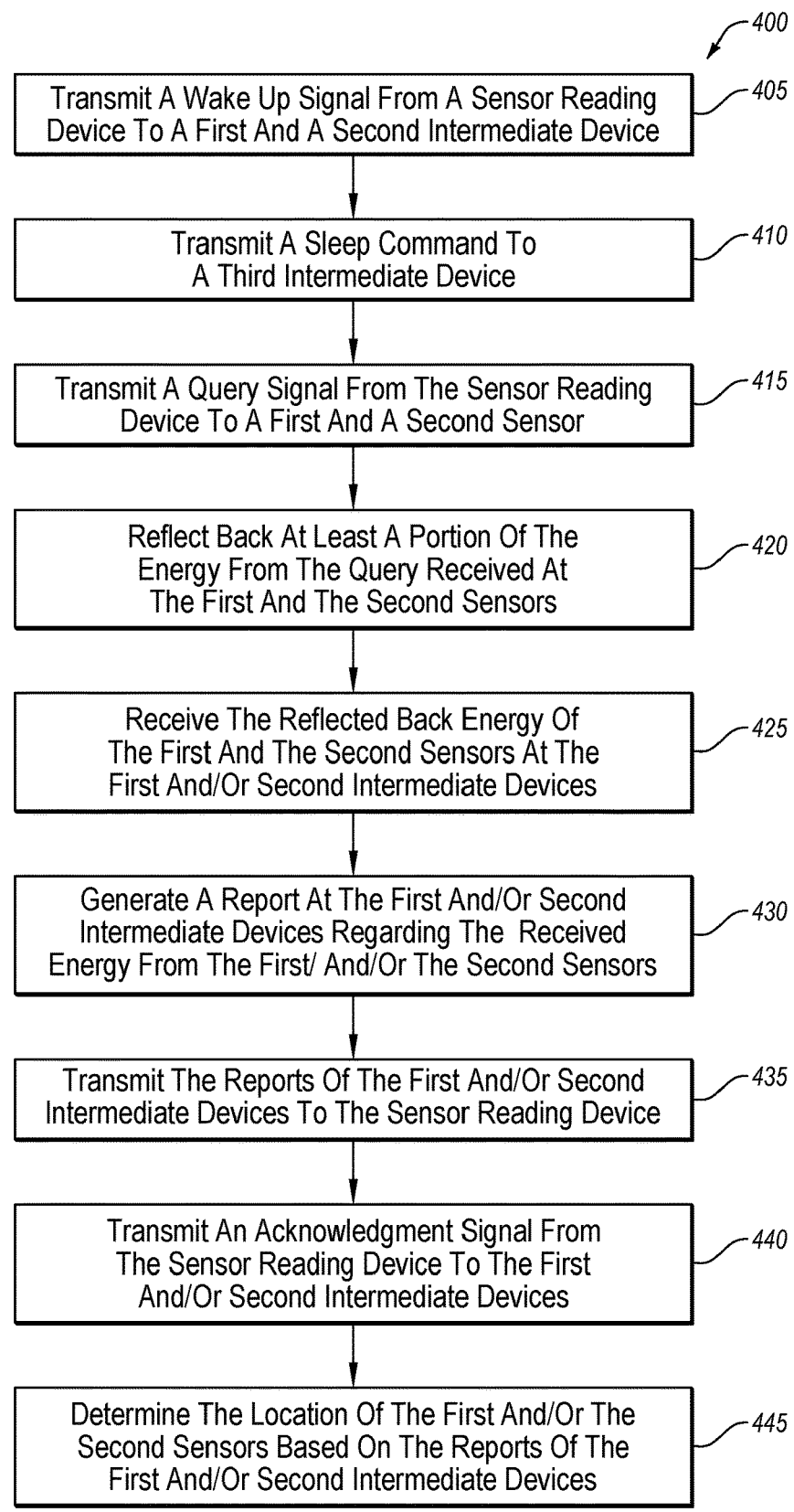
FIG. 4 illustrates a flowchart of an example method of sensor reading.

FIG. 4 illustrates a flowchart of an example method 400 of sensor reading, in accordance with one or more embodiments of the present disclosure. The method 400 may be performed by any suitable system, apparatus, device, or combinations thereof. For example, the system 100, the sensor reading device 110, and/or the intermediate device 120 of FIG. 1, the system 200, the sensor reading device 210, the first intermediate device 221, the second intermediate device 222, and/or the third intermediate device 223, the intermediate device 300, and/or the sensor reading device 380 of FIG. 3, or other systems or devices may perform one or more of the operations associated with the method 400. Although illustrated with discrete blocks, the steps and operations associated with one or more of the blocks of the method 400 may be divided into additional blocks, combined into fewer blocks, or eliminated, depending on the desired implementation.

At block 405, a wake up command may be transmitted from a sensor reading device (such as the sensor reading device 110 of FIG. 1, 210 of FIG. 2, or 380 of FIG. 3) to one or more intermediate devices, like a first intermediate device and a second intermediate device (such as the intermediate device 120 of FIG. 1, the first, second, or third intermediate devices 221, 222, and 223 of FIG. 2, or the intermediate device 300 of FIG. 3). For example, the sensor reading device may transmit an ultrasonic signal to wake up the intermediate devices. Such a wake up command may cause the first and second intermediate devices to transition from a low power standby sleep mode to a normal mode of operation.

At block 410, a sleep command optionally may be transmitted from the sensor reading device to a third intermediate device. In some embodiments, the third intermediate device may receive the wake up command of the block 405. Based on receiving the wake up command, the third intermediate device may transition from the sleep mode to a normal mode of operation. Based on receiving the sleep command, the third intermediate device may return to the sleep mode.

At block 415, a query signal may be transmitted from the sensor reading device to a first and second sensor (such as the sensors 130*a*-130*c* of FIG. 1, the sensors 231-238 of FIG. 2, or the sensors 390 of FIG. 3). Such a query signal may include RF energy to be reflected back by one or more of the sensors. For example, the query signal may include a radio signal to cause a sensor to reflect back the radio signal modulated with an identifier of the sensor. In these and other embodiments, the sensors may be non-powered sensors.

At block 420, at least a portion of the energy from the query signal may be reflected back from the first and the second sensors. For example, the first and the second sensors may include an antenna tuned to receive the query signal, such as a particular first RF signal, causing a current to be generated in the antenna. The current may activate an integrated circuit that is configured to adjust capacitance and/or resistance of the antenna to modulate the current in the antenna with an identification of the respective sensor. The modulated current may cause the generation of a second RF signal that is transmitted. In these and other embodiments, the first and the second sensors may include passive RFID tags.

At block 425, the reflected energy from the first and second sensors may be received at the first and/or second intermediate devices. For example, the first and second intermediate device may include components or circuitry to detect the reflected energy of sensors. Based on the proximity of the intermediate devices to the sensors and the signal strength of the reflected energy, the reflected energy may be received at the first intermediate device, the second intermediate device, or both.

At block 430, a report may be generated at the first and/or second intermediate devices regarding the received energy from the first and/or second sensors. For example, the respective intermediate device may convert the received energy into computer-readable data. The computer-readable data my include a sensor identifier and signal strength for each of the received energies. In some embodiments, the report may include reports from other intermediate devices. For example, the second intermediate device may generate a second report of the sensors the second intermediate device received energy from, and may provide that second report to the first intermediate device. The first intermediate device may generate a first report of the sensors the first intermediate device received energy from, and may append or combine the second report with the first report. In some embodiments, such a combination may include compiling data or only adding data to the first report regarding sensors not already detected by the first intermediate device.

At block 435, the reports may be transmitted from the first and/or the second intermediate devices to the sensor reading device. In some embodiments, the first and the second intermediate devices may transmit their respective reports directly to the sensor reading device, such as by device to device communication or over a network. Additionally or alternatively, the reports may be communicated over a multi-hop mesh in which one or more intermediate devices may receive reports from other intermediate devices and provide the reports to the sensor reading device.

At block 440, an acknowledgment signal maybe transmitted from the sensor reading device to the first and/or second intermediate devices. The acknowledgment signal may indicate to the respective intermediate device that the report was received. In some embodiments, the respective intermediate device may transition to a sleep mode based on receiving the acknowledgment signal.

At block 445, the location of the first and/or the second sensors may be determined by the sensor reading device. In some embodiments, the location may be determined based on the reports of the first and/or second intermediate devices. For example, the sensor reading device may associate the sensor as being proximate an intermediate device based on the signal strength in the report. As another example, the sensor reading device may compare signal strengths for a given sensor across multiple reports of multiple intermediate devices and use the multiple signal strengths to determine the location of the sensor relative to the multiple intermediate devices.

Accordingly, the method 400 may be used to obtain information from one or more sensors. Modifications, additions, or omissions may be made to the method 400 without departing from the scope of the present disclosure. For example, the operations of the method 400 may be implemented in differing order. For example, the block 410 may be performed at any time, such as after the block 435 or 440. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

FIG. 5 illustrates an example computing system 500, according to at least one embodiment described in the present disclosure. The computing system 500 may include any suitable system, apparatus, or device configured to facilitate the reading of information from sensors. The computing system 500 may include a processor 510, a memory 520, a data storage 530, and a communication unit 540, which all may be communicatively coupled.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform one or more of the operations of the method 400 of FIG. 4. For example, the processor 510 may cause a communication interface to transmit a wake up command, a query signal, a report, may generate a report, and may determine a location of a sensor, among other operations.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information. In some embodiments, the communication unit 540 may communicate with other devices at other locations, the same location, or even other components within the same system. For example, the communication unit 540 may include a modem, a network card (wireless or wired), an optical communication device, a radio frequency transducer, an ultrasonic transducer, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like, and/or combinations thereof. The communication unit 440 may permit data to be exchanged with a network and/or any other devices or systems described in the present disclosure. For example, the communication unit 540 may allow the computing system 500 to communicate with other systems, such as sensor reading devices and intermediate devices.

Modifications, additions, or omissions may be made to the computing system 500 without departing from the scope of the present disclosure. For example, the data storage 530 may be multiple different storage mediums located in multiple locations and accessed by the processor 510 through a network. As another example, the data storage 530 and the memory 520 may be combined as a single component, such as an on-board memory chip.

As indicated above, the embodiments described in the present disclosure may include the use of a special purpose or general purpose computer (e.g., the processor 510 of FIG. 5) including various computer hardware or software modules, as discussed in greater detail herein. Further, as indicated above, embodiments described in the present disclosure may be implemented using computer-readable media (e.g., the memory 520 or data storage 530 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the embodiments and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A device comprising:
    a wireless communication interface configured to communicate with a sensor reading device, receive a wake up command from the sensor reading device, and receive reflected energy from a sensor;
    one or more processors;
    one or more non-transitory computer readable media including instructions that, when executed by the one or more processors, perform or control performance of operations comprising:
        performing a wake up operation based on the wake up command from the sensor reading device;
        recording the reflected energy from the sensor, the reflected energy based on an energy transmission from a second device different from the device;
        generating a report regarding the reflected energy; and
        causing the wireless communication interface to transmit the report to the sensor reading device.

2. The device of claim 1, further comprising one or more power supplies included with the device to power the device.

3. The device of claim 1, wherein the wireless communication interface is configured to receive radio energy at one or more frequencies from a passive radio frequency identification (RFID) tag at the sensor.

4. The device of claim 1, wherein the wireless communication interface is configured to receive ultrasonic signals from the sensor reading device.

5. The device of claim 1, wherein the wireless communication interface is configured to receive wireless signals from the sensor reading device through a physical barrier and is configured to transmit wireless signals to the sensor reading device through the physical barrier.

6. The device of claim 1, wherein the wireless communication interface is configured to receive a second report from a second intermediate device, and wherein generating the report includes adding the second report to the report.

7. The device of claim 1, wherein the operations further include:
    receiving a plurality of instances of reflected energy from the sensor;
    averaging a signal strength of the plurality of instances of reflected energy; and
    including the averaged signal strength in the report.

8. The device of claim 1, wherein the report includes an identifier of the sensor and a signal strength of the reflected energy.

9. A method comprising:
    transmitting a wake up command to a battery-powered intermediate device;

transmitting a query to a non-powered sensor, the non-powered sensor configured to reflect back energy based on the query; and receiving a report from the intermediate device, the report including the energy of the query reflected by the non-powered sensor and received at the intermediate device.

10. The method of claim 9, wherein the non-powered sensor includes a passive radio frequency identification (RFID) tag.

11. The method of claim 9, further comprising:

transmitting a wake up command to a second battery-powered intermediate device;

transmitting the query to a second non-powered sensor; and wherein the report includes energy reflected from the second non-powered sensor received at the second intermediate device.

12. The method of claim 9, wherein transmitting a wake up command includes transmitting an ultrasonic signal.

13. The method of claim 9, wherein transmitting a query includes transmitting the query through a physical barrier, and wherein receiving a report includes receiving the report through the physical barrier.

14. The method of claim 9, further comprising transmitting an acknowledgment command to the intermediate device to indicate receipt of the report.

15. The method of claim 9, further comprising transmitting a sleep command to a second battery-powered intermediate device.

16. A system comprising:

a non-powered sensor configured to reflect back energy;

a sensor reading device configured to transmit a query signal to the non-powered sensor;

an intermediate device configured to perform operations including:

receive a wake up command from the sensor reading device;

after waking-up in response to the wake-up command, receive energy of the query signal from the sensor reading device reflected back from the non-powered sensor;

generate a report based on the received energy; and transmit the report to the sensor reading device.

17. The system of claim 16, further comprising:

a second non-powered sensor configured to reflect back energy; and a second intermediate device configured to perform operations including:

receive the wake up command from the sensor reading device;

after waking-up in response to the wake-up command, receive energy of the query signal reflected back from the second non-powered sensor;

generate a second report based on the energy received from the second non-powered sensor; and transmit the second report to the intermediate device.

18. The system of claim 17, wherein the report includes signal strength of the energy reflected back from the non-powered sensor and the second non-powered sensor to the intermediate device, and the second report includes signal strength of the energy reflected back from the non-powered sensor and the second non-powered sensor to the second intermediate device, and wherein the sensor reading device is configured to determine a location of the non-powered sensor and the second non-powered sensor based on the report and the second report.

19. The system of claim 17, wherein the intermediate device and the non-powered sensor are in a first physical enclosure and the second intermediate device and the second non-powered sensor are in a second physical enclosure.

20. The system of claim 16, wherein the report includes a signal strength of the reflected energy, and the sensor reading device is further configured to determine a physical location of the non-powered sensor based on the report.

* * * * *